(12) United States Patent
Hangsleben

(10) Patent No.: US 9,020,115 B2
(45) Date of Patent: Apr. 28, 2015

(54) INMATE COMMUNICATIONS

(71) Applicant: Dave W. Hangsleben, Las Vegas, NV (US)

(72) Inventor: Dave W. Hangsleben, Las Vegas, NV (US)

(73) Assignee: Hank Technology LLC, Grand Forks, ND (US)

( * ) Notice: Subject to any disclaimer, the term of this patent is extended or adjusted under 35 U.S.C. 154(b) by 0 days.

(21) Appl. No.: 14/273,772

(22) Filed: May 9, 2014

(65) Prior Publication Data

US 2014/0334610 A1 Nov. 13, 2014

Related U.S. Application Data

(60) Provisional application No. 61/855,116, filed on May 9, 2013.

(51) Int. Cl.
*H04M 3/00* (2006.01)
*H04M 3/22* (2006.01)
*H04M 1/247* (2006.01)
*H04M 3/42* (2006.01)
*H04M 1/253* (2006.01)

(52) U.S. Cl.
CPC .......... *H04M 3/2218* (2013.01); *H04M 1/2477* (2013.01); *H04M 1/2535* (2013.01); *H04M 3/42221* (2013.01)

(58) Field of Classification Search
CPC .......... H04M 3/36; H04M 15/00; H04N 7/15
USPC .............. 379/32.01, 114.17, 114.2, 188, 200; 348/14.01, 14.08
See application file for complete search history.

(56) References Cited

U.S. PATENT DOCUMENTS

| | | | |
|---|---|---|---|
| 5,926,533 A * | 7/1999 | Gainsboro | ..................... 379/188 |
| 7,046,779 B2 | 5/2006 | Hesse | |
| 7,061,521 B2 | 6/2006 | Bulriss et al. | |
| 7,899,167 B1 | 3/2011 | Rae | |
| 8,031,850 B2 | 10/2011 | Polozola et al. | |
| 8,204,177 B2 | 6/2012 | Harper | |
| 8,458,732 B2 | 6/2013 | Hanna et al. | |
| 8,477,662 B2 | 7/2013 | Schneider | |
| 8,582,738 B1 | 11/2013 | Keiser | |
| 2002/0106998 A1 | 8/2002 | Presley et al. | |
| 2005/0138667 A1 | 6/2005 | Delpuch | |
| 2007/0047734 A1 | 3/2007 | Frost | |
| 2008/0039053 A1* | 2/2008 | Polozola et al. | ........... 455/412.2 |
| 2008/0153457 A1* | 6/2008 | Stura et al. | .................... 455/406 |
| 2008/0201143 A1 | 8/2008 | Olligschlaeger et al. | |
| 2010/0299761 A1 | 11/2010 | Shapiro | |
| 2012/0262271 A1 | 10/2012 | Torgersrud et al. | |
| 2012/0281058 A1 | 11/2012 | Laney et al. | |
| 2013/0194377 A1* | 8/2013 | Humphries | ................ 348/14.08 |

(Continued)

OTHER PUBLICATIONS iWebVisit.com., "Inmate Video Visits bring you closer", Retrieved from https://www.iwebvisit.com/, 2013, 2 pages.

(Continued)

*Primary Examiner* — Quoc D Tran
(74) *Attorney, Agent, or Firm* — Brooks, Cameron & Huebsch, PLLC

(57) ABSTRACT

Inmate communications can include establishing a communication, between an inmate device and a registered device, and storing information associated with the communication in a local data store.

20 Claims, 4 Drawing Sheets

(56) References Cited

U.S. PATENT DOCUMENTS

2013/0226678 A1      8/2013   Perna
2014/0267547 A1*   9/2014   Torgersrud et al. ........ 348/14.02

OTHER PUBLICATIONS

Pheifer, Pat., "Users click with Dakota County's online jail visits", Retrieved from http://www.startribune.com/local/south/143419076.html, Mar. 19, 2012, 1 page.

Gresko., "Video kiosks link families, Indiana inmates", Retrieved from https://groups.yahoo.com/neo/groups/PrisonNewsNetwork/conversations/topics/37541%5d, Restricted Group—Also located at http://www.cbsnews.com/news/prison-visits-go-pay-per-view/, Jul. 6, 2009, 3 pages.

Yankova, Dessislava., "Video system brings inmates, kin closer", Published in The Tennessean, Nashville, TN, USA, Nov. 3, 2013, 2 pages.

* cited by examiner

Fig. 2

INMATE COMMUNICATIONS

CROSS-REFERENCE TO RELATED APPLICATION

This application claims priority to U.S. Provisional Application No. 61/855,116 filed on May 9, 2013, which is incorporated by reference.

BACKGROUND

Communications can enable inmates housed in penal institutions to interact with visitors. For example, a communication can permit a visitor to interact with an inmate housed in penal institution while the visitor is at the penal institution and/or while the visitor is remotely located from the penal institution. Such communications may have security considerations and/or privacy considerations, among other considerations associated therewith.

BRIEF DESCRIPTION OF THE DRAWINGS

FIG. 2 illustrates an example of a display in a user interface for inmate communications in accordance with the present disclosure.

DETAILED DESCRIPTION

Figure 1:
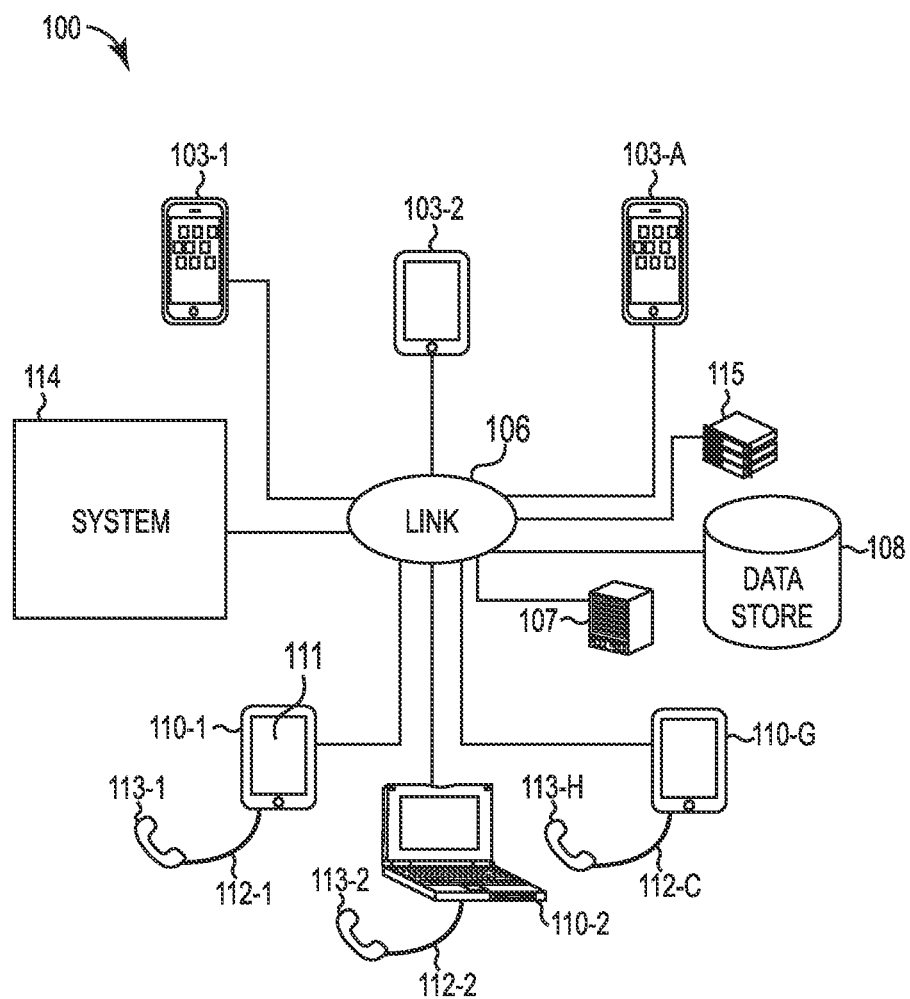
FIG. 1 illustrates an example of an environment in which various example processes can be implemented for inmate communications according to the present disclosure.

Communications between inmates and customers are widely used by a variety of incarceration facilities. Incarceration facilities refer to a location(s) including prisons and/or jails, among other types of incarceration facilities, which house inmates. An inmate refers to an incarcerated person, for instance, those in an incarceration facility. An incarceration facility such as a prison, may, for example, allow a communication between an inmate of the prison and a customer. A customer can refer to a family member, significant other, friend, and/or legal representative of an inmate that communicates with an inmate via a registered device, among other customers that communicate with an inmate via a registered device.

It can be desirable to control access of inmates to customers and/or to control communications between inmates and customers. For instance, controlling access to outside telephone lines and/or the internet may prevent inmates from incurring communication costs which an incarceration facility may ultimately be responsible for paying. More specifically, ensuring an inmate and/or customer incurs a cost associated with a communication, rather than an incarceration facility or other entity (e.g., an entity facilitating the communication) incurring the cost can be desirable. Further, it may be desirable to control, monitor, analyze, and/or, when legally permissible, record communications between inmates and customers. Such a recording can promote real-time monitoring of a communication and/or subsequent analysis of a communication, such as analysis of previously recorded communication.

A communication can be an on-site communication and/or a remote communication. An on-site communication refers to a communication established while a customer (e.g., a visitor to an incarceration facility) is onsite at a location of an incarceration facility (e.g., an incarceration facility housing an inmate involved in the on-site communication). A remote communication refers to a communication established while a customer is at a location other than a location of an incarceration facility. For example, a remote communication may be provided via a voice-over internet protocol (VOIP) gateway in combination with a VOIP device(s). The VOIP device(s) may have respective media access control (MAC) addresses, which may enable an internet-based communication (e.g., a video communication) between an inmate and a customer located outside an incarceration facility housing the inmate. However, such internet-based communications rely upon the internet and/or the respective MAC addresses of the VOIP devices(s) to facilitate the internet-based communications and/or may not enable non-internet based communications, such as an analog and/or digital telephone communication, due a lack of non-internet infrastructure (e.g., a hardwired telephone network, etc.). Moreover, control, monitoring, recording, and/or analysis of such internet-based communications utilizing internet devices such as those with respective MAC addresses can be challenging, costly (e.g., time-consuming), and/or ineffective, among other difficulties.

In contrast, examples of the present disclosure include methods, systems, and computer-readable and executable instructions for inmate communications. Inmate communications can, for example, include establishing a communication, between an inmate device (e.g., a tablet) and a registered device, and storing information associated with the communication (e.g., a recording of the communication) in a data store. Advantageously, such inmate communications can facilitate control, monitoring, analysis, recording, and/or local storage of sensitive information such as an established communication and/or information associated with the communication (e.g., a telephone number associated with a registered device).

Additional advantages can be realized by utilizing a central server to store billing information and/or promote automatic authorization of communications, for example, authorizing a communication when a cost associated with the communication is satisfied, as described herein. Further advantages can be realized by establishing an audio communication in response to a video communication being unavailable, for example, establishing an audio communication by the local server via a public switched telephone network (PTSN), for example, in response to a VOIP network being unavailable.

FIG. 1 illustrates an example of an environment 100 in which various example processes can be implemented for inmate communications. The environment 100 is shown to include a system 114 for inmate communications, registered devices 103-1, 103-2, . . . , 103-A, inmate devices 110-1, 110-2, . . . , 110-G, cables 112-1, 112-2, . . . , 112-C, handsets 113-1, 113-2, . . . , 113-H, a data store 108, a link 106, a local server 107, and a central server 115. The data store 108 and/or system 114 for inmate communications can be analogous to the data store 308 and/or system 340, respectively, discussed with respect to FIG. 3.

The system 114 for inmate communications can represent different combinations of hardware or hardware and instructions for inmate communications. The system 114 for inmate communications can include a computing device (not shown), for instance, computing device 455 as discussed with respect to FIG. 4. The system 114 can include engines analogous to engines described with respect to FIG. 3. For example, the system 114 can include an initiate engine and an establish engine, as described herein with respect to FIG. 3, among other engines.

Registered devices 103-1, . . . , 103-A, can communicate with inmate devices 110-1, . . . , 110-G. Registered devices 103-1, . . . , 103-A represent electronic devices that can generate and/or receive electronic data having browsers and/or other applications to communicate such electronic data and/or facilitate inmate communications, among other capabilities. Examples of registered devices 103-1, . . . , 103-A can include desktop/laptop computers, mobile phones, digital telephones, and/or analog telephones, among other electronic devices suitable for inmate communications. The registered device can include a capability to transmit video data and/or audio data (e.g., for video and/or audio communications), for example, via link 106, to inmate devices 110-1, . . . , 110-G.

Each registered device can be registered with an entity other than an incarceration facility (e.g., an incarceration facility utilizing the same for inmate communications). For instance, such an entity can be the same as an entity that owns and/or controls some or all of the link 106, the inmate devices 103-1, . . . , 103-A, the local server 107, and/or the central server 115. For example, an entity other than an incarceration facility can own the local server 107 and/or the entity can register each of a plurality of registered devices 103-1, . . . , 103-A having a capability to communicate via the local server 107 for inmate communications.

Registration of a registered device can include procuring, receipt, and/or storage of information which can identify a registered device, a customer(s) associated with a registered device (e.g., an owner of registered device), and/or otherwise promote inmate communication between the registered device and an inmate device. Such information can include a telephone number associated with a registered device, an IP address associated with a registered device (e.g., for VOIP communications), and/or a network address, among other information. For instance, a registered device can have an IP address and a telephone number associated with the registered device, among other information. In some examples, registration can include verification of a capability of the registered device, such as a capability to establish or otherwise promote an audio communication and/or a video communication, as described herein.

Storage of information from such registration that can identify a registered device, customer associated with the registered device, etc. can be stored locally in a local server. For instance, on-site registration of a customer, registered device, and/or an inmate device can provide information that can be stored locally. Advantageously, local storage of information can enable inmate communication (e.g., on-site communications) when non-local resources (e.g., the internet, a central server, etc.) are not available and/or reduce an amount of information exchanged (e.g., reduce an amount of bandwidth utilized) with non-local resources, among other advantages. However, the present disclosure is not so limited. For example, registered devices and/or customers involved in remote communications can be registered remotely and/or have identifying information associated with the remote communications stored non-locally (e.g., in a central server).

A communication can utilize an internet transmission/connection, for example, a VOIP capability of the registered device and/or a PSTN connection, among other components, in combination with the link 106 to facilitate video and/or audio communication, as described herein, between a registered device of the registered devices 103-1, . . . , 103-A and an inmate device of the inmate devices 110-1, . . . , 110-G. Notably, in either case, a registered device is associated with a registered telephone number to enable a communication between the registered device and an inmate device, in contrast to other approaches that may rely upon a MAC address to provide communications. Establishing communications between a registered device associated with a registered telephone number and an inmate device can promote monitoring and/or recording of communications and/or can enable establishing an audio communication (e.g., established by the local server) between a registered device and an inmate device via a PTSN, among other advantages. Other approaches relying upon a MAC address may not be able to provide communications via a PSTN, among other disadvantages.

Similar to registered devices 103-1, . . . , 103-A, inmate devices 110-1, . . . , 110-G represent electronic devices that can generate and/or receive electronic data having browsers and/or other applications to communicate such electronic data and/or facilitate inmate communications, among other abilities. Examples of inmate devices 110-1, . . . , 110-G can include electronic tablet devices and/or laptop computers, etc. that can facilitate audio and/or video communications such as a VOIP communication and/or analog/digital telephone communications via a PSTN. For example, an inmate device can initiate a communication request for a video communication and/or an audio communication, as described herein.

Inmate devices 110-1, . . . , 110-G can include a variety of components and/or be located at a variety of locations with an incarceration facility(s). For example, inmate devices 110-1, . . . , 110-G can include respective cables 112-1, . . . 112-C and/or handsets 113-1, . . . , 113-H, among other components to promote inmate communications. A handset can include a microphone for receiving audio inputs and/or circuitry to transmit received audio inputs to a cable and/or inmate device, among other components. For example, an inmate device can include an armored handset (e.g., tamper-resistant handset) coupled thereto by an armored handset cable (e.g., with a lanyard). Such a wired coupling of a handset via a cable to an inmate device can facilitate communications such as those utilizing a PSTN network and/or promote privacy, as compared to devices that may not include a handset. However, the present disclosure is not so limited. That is, an inmate device can be coupled to a suitable handset using a suitable wired cable or wireless cable to promote inmate communications. For instance, in some examples, a handset can be wirelessly coupled to an inmate device.

Inmate devices 110-1, . . . , 110-G can be included within an enclosure. In some examples, an inmate device can be mounted on a stationary surface (e.g., a wall), surrounded by a number of walls, surrounded by a number of viewing portals (e.g., transparent shatter-resistant material), and/or otherwise located within an enclosure. An enclosure can be of sufficient size to promote on-site communications between an inmate of an incarceration facility and a customer at a location of the incarceration facility. For example, a visitation terminal can be arranged to include a steel enclosure with a protective window. However, the present disclosure is not so limited. For example, inmate devices 110-1, . . . , 110-G can be portable (not mounted to a stationary surface) and/or enclosed with an enclosure (e.g., a protective steel enclosure including a protective transparent window to enable viewing of a display of an inmate device).

In various examples, the inmate devices 110-1, . . . , 110-G and/or central server(s) 115 can be separate and distinct from each other. As described herein, being separate and distinct refers to an environment being physically separate and/or having separate network resources (e.g., network resources) with respect to each other. In contrast, local server(s) 108 can be a located in a shared environment and/or have shared network resources with the inmate devices 110-1, . . . , 110-G. In this manner, an inmate device can, in some examples, communicate with a local server, such as those described herein, but not with a central server, to locally facilitate a communication (e.g., an on-site communication) and/or replay locally stored communication data, among other possibilities. However, the present disclosure is not so limited. That is, the inmate devices 110-1, . . . , 110-G and/or central server(s) 115 can, in some examples, directly and/or indirectly communicate to promote inmate communications, as described herein. For example, a central server can provide billing information to a local server and/or inmate device, among other possibilities.

The inmate devices 110-1, . . . , 110-G can include an electronic display such as a graphical user interface (GUI) 111. A user interface (UI) can include hardware components and/or computer-readable instruction components. For instance, hardware components can include input components (e.g., a mouse, a touch screen, and a keyboard) and/or output components (e.g., a display). An example UI can include a GUI. A GUI can, for example, electronically represent information associated with a recorded communication (e.g., identifying information such as a name(s), an inmate personal identification number (PIN) that identifies a particular inmate, a telephone number, a cost(s) associated with a communication(s), among other information associated with the recorded communication) and/or display a prompt (including a plurality of electronic representations) via an inmate device, among other electronic representations.

A monitoring device (not shown) can include a GUI that can display information associated with a communication (e.g., a video/audio recording of communication and/or identifying information). In some examples, the displayed information can include a unique address of the inmate device that can be associated with at least one of a recording of the communication and/or billing information (e.g., a payment and/or a registered account balance) related to the communication. For example, a unique address can be included in identifying information associated with a recorded communication. A unique address refers to an identifier of a physical location of an inmate device within an incarceration facility. A unique address can include a network address assigned to an inmate device and/or an on-site registered device. For example, an inmate device can have a unique address associated with a visitation room or portion of a visitation room and/or identify a particular incarceration facility of a plurality of incarceration facilities, among other locations in an incarceration facility.

Notably, a unique address of an inmate device can vary, for example, varying based upon a change in a physical location of the inmate device. For example, an inmate device in a first location (e.g., cellblock 6) within an incarceration facility can have a first unique address associated with the inmate device. In such an example, when the inmate device is physically moved to a different location such as a second location (e.g., cellblock 3) in the incarceration facility than a second unique address can be associated with the inmate device. For example, a unique address can correspond to information identifying a unique network address relative to a physical location on a network such as a local network within an incarceration facility. Association of unique addresses relative to a physical location of an inmate device can promote monitoring and/or recording of inmate communications, among other advantages.

The monitoring device can communicate with the local server 107 and/or central server 115. The monitoring device can be an inmate device of the inmate devices 110-1, . . . , 110-G, for instance, an inmate device in possession at a given time by a non-inmate having authority to performing monitoring and/or replay of a communication (e.g., a guard of an incarceration facility) or the monitor device can be another electronic device capable of communication and display of electronic information.

The monitoring device can communicate with and/or be controlled by an entity other than the incarceration facility, such as an entity that owns or otherwise controls a local server, among other components for inmate communications. The monitoring device can communicate various information including a telephone number and/or IP address which the incarceration facility wishes the entity to prohibit an inmate(s) from being able to establish a communication with. The entity can store such information. For example, the entity can store a telephone number (e.g., a telephone number of a registered device), a customer name, and/or an IP address that an inmate is prohibited from calling and use such stored information to block the inmate and/or an inmate device from communication with the same, among other abilities.

The monitoring device can enable and/or terminate communications between an inmate device and a registered device. For example, a monitoring device can monitor an on-site live communication between a registered device and an inmate device. The live communication can be an on-site communication and/or a remote communication. For example, a monitoring device can enable a communication having a cost associated therewith that has been satisfied, as described herein, to be established, for example, in response to an input received via a GUI of a monitoring device. For instance, an on-site communication can be established upon a monitoring device enabling such a communication. Similarly, a live communication such as a monitored communication can be terminated by the monitoring device, for example, in response to an input received via a GUI of a monitoring device.

Link 106 (e.g., a network) represents a cable, wireless, fiber optic, and/or remote connection via a telecommunication link, an infrared link, a radio frequency link, and/or other connectors or systems that provide electronic communication. That is, the link 106 can, for example, include a link to an intranet, a link to the Internet, or a combination of both, among other communication interfaces, to enable VOIP communications, etc. The link 106 can also include intermediate proxies, for example, an intermediate proxy server, routers, switches, load balancers, and the like among other component to enable non-VOIP communications (e.g., a communication via a PTSN).

However, the present disclosure is not so limited. That is, link 106 can represent a local server, as described herein, and/or can represent a physical connection between the registered devices 103-1, . . . , 103-A and the inmate devices 110-1, . . . , 110-G to communicate instructions between the inmate devices 110-1, . . . , 110-G, the local server 107, the central server 115, and/or the data store 108. Some or all of the link 106, the inmate devices 103-1, . . . , 103-A, and/or the local server 107, and/or the central server 115 can be owned (purchased) and/or controlled by an entity other than an incarceration facility utilizing the same for inmate communications. Advantageously, such control can free an incarceration facility from having to incur information technology, component costs, and/or other costs associated with physical hardware, software, etc. included in or comprising the link 106, the inmate devices 103-1, . . . , 103-A, and/or the local server 107, and/or the central server 115.

The central server 115 can refer to physical server(s), switches (e.g., a central switch), and/or cloud-based server systems. The central server(s) 115 can be coupled to a local server(s) via the internet. A cloud-based computing server system refers to computational resources that can be linked through the use of the internet and/or cloud based computer networks. Allocation of the computation resources included in a cloud-based server system can be varied to meet changing demands, such as changes in a total number of communications between inmates and customers, among other demands placed upon the cloud-based server system. The cloud-based server system can include a private cloud system and/or a hybrid cloud system. For example, a public cloud system and a private cloud system can include and/or constitute a hybrid system.

A public cloud system can include a cloud service provider that makes resources (e.g., applications and storage) available to the public over the Internet. A public cloud system can be free or offered for a fee, for example.

A private cloud system can include a computing environment that provides hosted services to a limited number of people behind a firewall. For example, a private cloud can include a billing system (not shown), a number of computing devices (e.g., databases), and virtualization (e.g., virtual machines) (not shown), among others. For instance, a private cloud system can include a computing environment that provides hosted services to a limited number of the plurality of nodes (e.g., computer) behind a firewall. The billing system, for example, can integrate internal and external billing information (e.g., registered account balances) across an entire enterprise and/or organization, such as an incarceration facility and/or a plurality of incarceration facilities. The public cloud system and the private cloud system can be bound together, for example, through an application in the public cloud system and the billing system in the private cloud system. However, some or all of the billing system can be maintained in traditional physical servers.

A hybrid cloud (e.g., traditional/cloud IT environment), for example, can include a mix of traditional server systems, private cloud systems, public cloud systems, and/or dynamic cloud services. For instance, a hybrid cloud/traditional IT environment can involve interdependencies between physically and logically separated services including multiple systems. A hybrid cloud/traditional IT environment, for example, can include a number of clouds (e.g., two or more clouds) that can remain unique entities but can be bound together.

The central server 115 and/or a central switch included in and/or associated with the central server can maintain billing information related to an inmate (e.g., billing information including an inmate PIN and/or a balance of a phone card purchased by an inmate), an inmate device, a particular communication, and/or a customer, among other billing information. For example, the central server can maintain billing information including an account balance associated with a customer(s), such as a registered account balance. Customers and/or inmates, among others, can contribute to a balance of a registered account. The registered account can enable a particular customer to draw funds from a balance of the registered account. For example, a customer can draw funds for a balance of a registered account in response to a communication request from an inmate device and/or a plurality of inmate devices. That is, in some examples, a plurality of inmates and/or inmate devices can call a particular registered device over a period of time. This can enable costs associated with communications to the plurality of inmates and/or inmate devices to be drawn from a single register account, in some examples. A balance of the registered account can be equal to a total amount of money contributed to the account less a total amount of cost(s) associated with communications that have been established (e.g., costs of previous communications conducted), among other ways to calculate a balance. That is, the central server can maintain a plurality of respective registered account balances associated with each customer (e.g., a registered customer) of a plurality of customers. Similarly, the central server 115 can maintain a plurality of respective account balances associated with each phone card of a plurality of phone cards such as those owned by inmates. In this manner, a cost associated with a communication can be compared with a respective balance of a particular account (e.g., comparison with a balance of a phone card and/or a balance of a registered account associated with a customer and/or a registered device).

Such a comparison can determine whether a cost associated with the communication satisfies (e.g., an account balance meets or exceeds the cost associated with the communication) or whether the cost associated with the communication is not satisfied (e.g., an account balance is comparatively less than a cost associated with a communication). However, the present disclosure is not so limited. A cost associated with a communication can be deemed to be satisfied when a line of credit and/or a collect communication to a customer is accepted, among other possible scenarios to satisfy a cost associated with a communication.

For example, an inmate can input a selection of information (e.g., a phone number) and an outgoing communication request can be placed via a local server to a customer having a registered device (e.g., with a registered phone number). If the customer provides payment for the communication, the inmate can be connected to the customer via a communication (e.g., the communication request is terminated and the communication is established). In contrast, if the customer does not provide payment, the inmate does not pay with a balance of a phone card, and/or a balance associated with the customer does not satisfy the cost associated with the communication then the communication request can be declined (e.g., a communication is not established between the customer and the inmate).

A local server 107 refers to a server (e.g., a traditional physical server and/or group of server(s)) located at an incarceration facility. Advantageously, having a local server at a location of an incarceration facility can promote secure monitoring, recording (e.g., locally recording and storing on-site communications to realize an reduction in bandwidth, in contrast to other approaches that may upload via the internet or otherwise store communication non-locally) and/or replay of communications. A communication, albeit an audio and/or video communication, established between an inmate device included in an incarceration facility and a registered device is stored locally. That is, while each communication established between a registered device and a visitor device may or may not (e.g., a legally privileged communication which is not to be monitored and/or recorded) be monitored and/or recorded, communications that are monitored and/or recorded are stored locally at a local server 107, not at a central server 115.

In some examples, an entire communication can be stored locally at the local server 108 and/or a local data store, in contrast to other approaches, which may store only identification information locally and/or and rely upon such identification information to communicate with a central server/ retrieve an actual recording of a communication stored at the central server. Advantageously, storing each recorded communication locally (e.g., storing an entire recorded communication locally) can promote secure inmate communications, particularly for on-site communications established locally at an incarceration facility and/or promote secure monitoring, replay, and/or recording of inmate communications, among other advantages.

Figure 2:
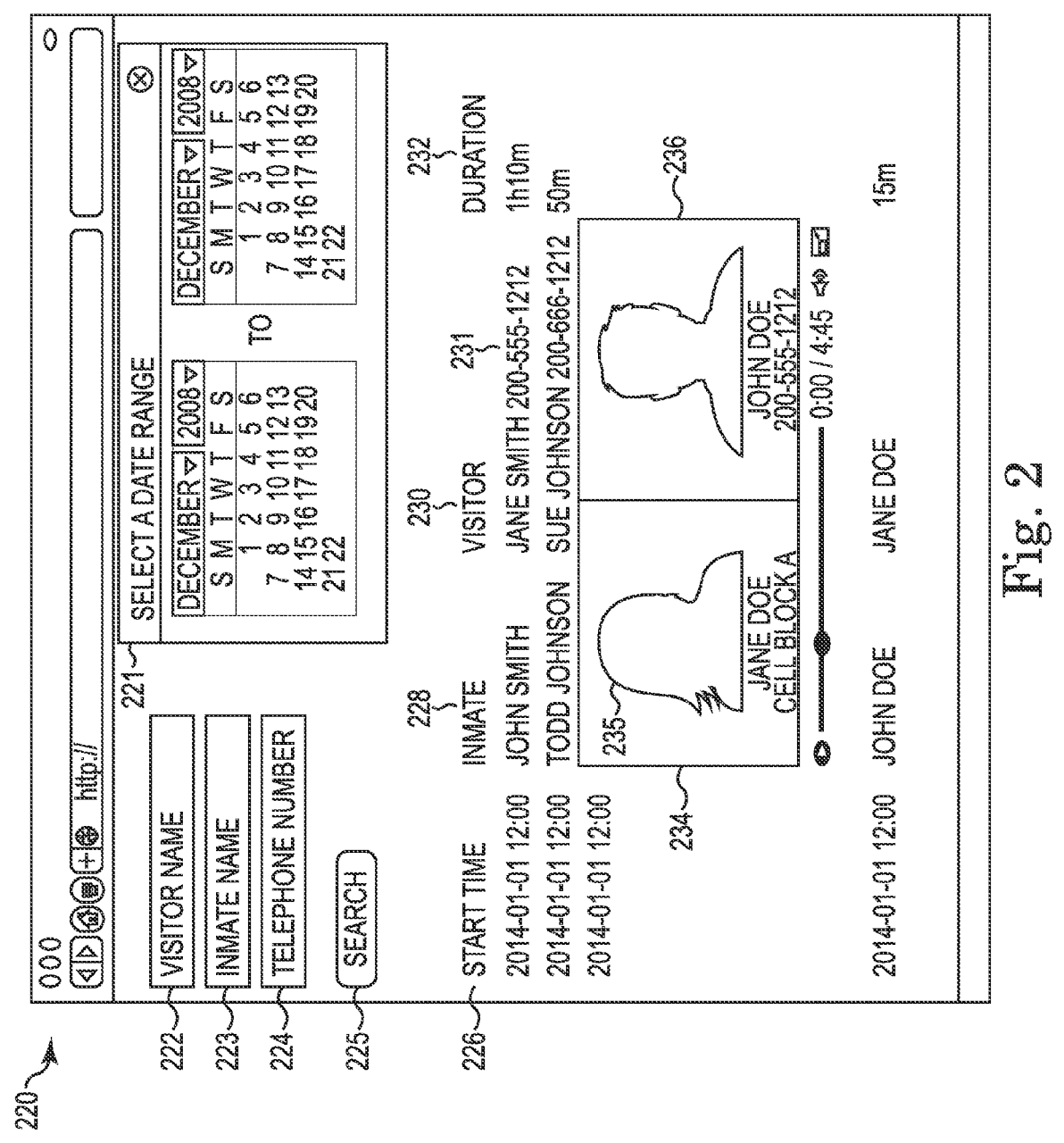

FIG. 2 illustrates an example of a display in a UI for inmate communications in accordance with the present disclosure. UI 220 can be displayed via a display of an inmate device and/or monitoring device, etc. For example, information associated with a recorded communication can be displayed.

The UI 220 can include a plurality of electronic representations (e.g., 222, 223, etc.), a plurality of names (e.g., customer and/or inmate names), and/or a plurality of statuses (not shown) corresponding to a plurality of inmate devices, among other displayed items included in the UI.

The UI 220 can enable searching of communications. Live or recorded communications can be searched and monitored and/or replayed, for example, by displaying a live and/or recorded communication via the UI 220. For instance, a video communication can have video data and/or audio data replayed via the UI 220 and/or related components (e.g., output components such as speakers associated with the UI 220). Similarly, an audio communication can be monitored and/or replayed via the UI 220 and/or related components. Such searching can be performed based on a customer name 222, an inmate name 223, a telephone number 224 (e.g., a telephone number associated with a registered device and/or a telephone number dialed by an inmate device), a date range 221, a time of day range (not shown), an particular incarceration facility location of a plurality of incarceration facilities (not shown), etc.

A search can be initiated by selecting search criteria and/or selection of a search 225 graphical representation such as an icon, among other possibilities. For example, a search based on telephone number 224, telephone number corresponding to 200-555-1212, can yield a result similar to a communication of the plurality of communications illustrated in UI 220. A communication, such as those resulting from an above described search, can include information associated with the communication (e.g., a recorded communication). Information associated with a communication can include a start time 226 of the communication, an end time of the communication (not shown), a duration 232 of the communication, a name of an inmate 228 participant in the communication, a name of a customer 230 participant, billing information (e.g., a cost associated with a communication and/or a method of payment of the cost associated with the communication) (not shown), a telephone number associated with a registered device involved in the communication 231, audio data (e.g., an audio recording), and/or video data (e.g., a video recording of a video communication), among other information associated with the communication. Video data can include video data associated with a customer 234 including display video data of the customer 235 and/or display of video data of an inmate 236. Such a display can occur simultaneously, as illustrated in UI 220, to facilitate monitoring and/or review of inmate communications.

A UI can simultaneously display a total number of communications occurring (e.g., 3 of 42 inmate devices have an "in use" status at a given time) and/or a total number of communications recorded (e.g., 133 communications recorded for a given day) at a given incarceration facility(s), however, the present disclosure is not so limited. That is, a total number of the plurality of communications, a number of locations, a naming convention (e.g., a legend), and/or a respective types of statuses displayed are not so limited. Rather, the displayed items (e.g., a plurality of electronic representations, etc.) can be varied and/or include more of less displayed items to promote inmate communications, as described herein.

The plurality of electronic representations, the plurality of names, and/or a plurality of statuses can each have a functionality (e.g., a respective functionality) associated therewith. For example, selection of an electronic representation may cause the UI to perform an action (e.g., display a drop down menu, display a free text area, display a drill down menu, and/or cause an application utilizing the UI to perform a function). That is, the plurality of electronic representations the plurality of names, and/or a plurality of statuses, etc., can facilitate a user (e.g., an inmate) to interact with the UI (e.g., provide an input to cause the UI to perform the functionality). For example, displaying the electronic representation can include causing a display of a prompt and/or receiving a selection of information displayed in the prompt in response to the display of the prompt. Similarly, a user (e.g., an employee of an incarceration facility) can interact with a UI to cause replaying the locally stored recorded communication, for instance, upon receipt of an input via a UI, among other possibilities.

Moreover, the content of the display can vary, for example, a prompt, as described herein, and/or other information can be displayed via UI 220. For example, a UI can display a monitoring screen and/or a replaying screen. Such replaying and/or monitoring screen can enable comparison and/or monitoring of a plurality of inmate communications, for example, comparison of telephone numbers, inmate names, images and/or audio recordings of inmates, images and/or audio recordings of customers, and/or customer names, among other information, associated with a plurality of inmate communications (e.g., in-progress and/or previously conducted communications). Information associated with a plurality of communications can be displayed simultaneously, as described herein, via the UI 220.

Inmate communications from a plurality of incarceration facilities can be monitored and/or replayed, among other possibilities. Such cross-incarceration facility monitoring and/or replay can promote tracking, monitoring, and/or otherwise controlling inmate communications. For instance, a telephone number associated with a registered device may be determined to have communicated with a plurality of inmates located at a number of incarceration facilities. Knowledge of the same can be advantageous, particularly for employees of incarceration facilities and/or law enforcement officials, etc.

Figure 3:
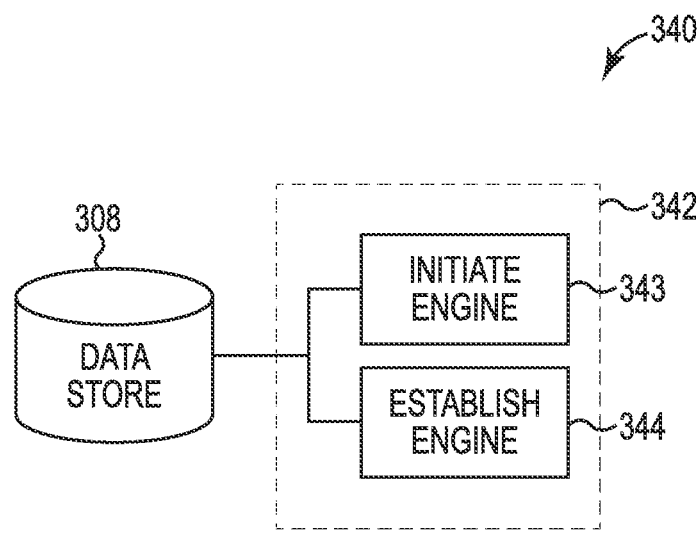
FIG. 3 illustrates a diagram of an example of a system for inmate communications according to the present disclosure.

FIG. 3 illustrates a diagram of an example of a system 340 for inmate communications according to the present disclosure. The system 340 can include a data store 308 (e.g., analogous to data store 108 as referenced in FIG. 1), an inmate communications system 342, and/or a number of engines. The inmate communications system 342 can be in communication with the data store 308. The inmate communications system 342 can include a number of engines (e.g., initiate engine 343, establish engine 344, etc.). The inmate communications system 342 can include additional or fewer engines than illustrated to perform the various functions described herein.

The number of engines can include a combination of hardware and programming to perform a number of functions described herein (e.g., an establish engine establishes a communication, etc.). Each of the engines can include hardware or a combination of hardware and programming designated or designed to execute a module (e.g., a particular module).

The programming can include instructions (e.g., software, firmware, etc.) stored in a memory resource (e.g., computer-readable medium) as well as a hard-wired program (e.g., logic).

The initiate engine 343 can be configured to initiate a communication request. For example, the initiate engine can, in some examples, initiate a communication request to utilize a verified communication capability of the registered device. A verified capability refers to a particular type of communication capability (e.g., a video communication capability) of a register device that has been tested (e.g., previously tested by an entity other than an incarceration facility and/or incarceration facility staff) and is sufficient to perform an audio communication and/or a video communication using the communication capability. Being sufficient can include a capability to maintain a threshold amount of transmission speed (e.g., frames per second for a video communication), having particular software (e.g., a downloadable software application), firmware, and/or hardware (e.g., a physical handset to facilitate an audio communication established by the local server via a PTSN to support a communication, etc. For example, a registered device can have an ability to perform a video communication verified, such as a VOIP communication. In this manner, capabilities that have been verified may be displayed via a prompt, as described herein. Displaying verified capabilities (e.g., displaying only verified capabilities, not non-verified capabilities) of registered devices can promote efficient inmate communications, among other advantages.

Verification of a capability and/or registration of inmate devices, as described herein, can be promoted by downloading of an application to a registered device. For instance, an application can be downloaded to a registered device to promote a video communication between the registered device and an inmate device. Similarly, downloading of an application to a registered device (e.g., a device to be registered) can promote registration of the device. However, downloading of applications or other information is not a prerequisite for inmate communications, as described herein. Rather, a video communication and/or and audio communication can be facilitated using existing (e.g., factory) provided software and/or hardware, among other components of a registered device. Similarly, registration can be promoted by on-site registration of a customer with an entity and/or an incarceration facility, registration via a website maintained by an entity other than an incarceration facility (e.g., an entity that owns a local server, inmate devices, and/or other components for inmate communications), or otherwise registered to promote inmate communications.

Verification of registered devices is performed by an entity (e.g., a third party) other than an inmate, a customer, and/or an incarceration facility (an incarceration facility employee). Such an entity can own and/or control some or all of the link 106, the inmate devices 103-1, . . . , 103-A, and/or the local server 107, and/or the central server 115 can be owned (purchased) and/or controlled by an entity. Advantageously, an entity owning some or all of the link 106, the inmate devices 103-1, . . . , 103-A, and/or the local server 107, and/or the central server 115 can readily verify capabilities to registered devices to facilitate inmate communicate via the link 106, the inmate devices 103-1, . . . , 103-A, and/or the local server 107, and/or the central server 115.

However, a capability of a device, though verified, may not be displayed via an inmate device and/or may not be selectable via an inmate device (e.g., a non-verified capability may be displayed but may be purposefully unable to be selected). A verified capability of a registered device that is unavailable may not be displayed and/or can be not able to be selected (e.g., grayed-out, transparent, struck-through, or otherwise visually indicated as not able to be selected) when a cost associated with the verified capability (e.g., a video call) is not satisfied by a balance of an account, as described herein. That is, in some examples, only verified capabilities which are available (e.g., having a respective cost associated therewith that is satisfied) can be displayed in a prompt of an inmate device and/or selected from the prompt. Further, an audio communication can be established by the local server via PTSN, for example, in response to a VOIP network being unavailable (e.g., when a cost associated with a communication utilizing a VOIP network is not satisfied). In some examples, being unavailable can refer to a video communication capability being unverified and/or otherwise unsupported by a particular inmate device.

A communication request can include identifying information. Identifying information can include numeric and/or alpha numeric information, among other information, to identify an inmate (e.g., an inmate name and/or an inmate PIN), an account associated with an inmate, an inmate device, a customer, and/or a registered device. Identifying information can be input via an inmate device, stored in a data store (e.g., a local data store), local server, and/or central server, and/or associated with a registered device and/or an inmate device. For example, a prompt can be displayed via an inmate device and a selection of information displayed in the prompt can include a communication request and/or identifying information (e.g., an inmate PIN can be input in order for a communication request associated with the inmate PIN to be sent). Identifying information can include a unique address, as described herein, of an inmate device specific to a particular inmate device. Identifying information can be provided to a local server, central server, and/or another device (e.g., a device used to monitor and/or record a communication), among other devices. In any event, initiate engine 343 can initiate a communication, for example, in response to an input received via an inmate device.

An authorization engine (not shown) can receive, from a local server, an authorization to permit a communication between the inmate device and a registered device associated with a registered telephone number. A communication can be authorized when a balance of an account associated with an inmate satisfies (e.g., meets or exceeds) a cost associated with a communication. However, if a balance of an account does not satisfy a cost associated with a communication then such a communication may not be authorized. In some examples, a communication between an inmate and/or a customer having a balance of an account that does not satisfy a cost associated with a communication can still be authorized if an alternative payment is provided (e.g., a collect communication is accepted by a customer, etc.). An authorization, can, in some examples, initiate from a central server to a local server that can provide an authorization to an inmate device. However, a local server can, in some examples, authorize a communication without receiving an authorization or other information from a central server. For instance, a local server can authorize an on-site communication and/or other communication without receiving an authorization from a central server to promote inmate communications.

An establish engine 344 can be configured to establish a communication between an inmate device and a registered device associated with a registered telephone number and/or causes a communication between the inmate device and a registered device associated with a registered telephone number to be established. For instance, an establish engine, in combination with a local server coupled to an inmate device (e.g., coupled via a link), responsive to receipt of a communication request, such as those described in regard to the request engine 344, can establish a communication between an inmate device and a registered device associated with a registered telephone number. The communication, in some examples, can include an audio communication established by the local server via a PSTN, among other types of communications.

Again, the local server can store information associated with the communication in a local data store. Information associated with the communication can include a recording of the communication (e.g., a video recording) and/or identifying information, as described herein. In some examples, a local server can store a recording of a communication and/or identifying information in a local data store (e.g., a data store included in a location of incarceration facility housing an inmate using a particular inmate device to conduct the recorded communication).

A record engine (not shown) can be configured to record information associated with the communication including recording a communication and/or identifying information associated with the communication and/or cause a communication to be recorded. That is, the record engine can include various audio, visual, and/or other components to record communications and/or can cause other devices such as audio and/or video recording components in other devices to record communications, among other suitable ways to facilitate recording of communications. For example, the record engine can record a communication established by the establish engine 344.

A monitor engine (not shown) can be configured to monitor a communication. Such monitoring can occur in combination with recording of a communication and/or a communication can monitored or recorded depending upon various parameters such as a type of communication, a security level of an incarceration facility, an inmate and/or a customer participant in the communication, an availability of an individual (e.g., an incarceration employee such as a guard) to monitor a given communication, etc.

A store engine (not shown) can store the recorded communication and/or information associated with the communication, as described herein, in a local server (e.g., in a local data store included in a local server and/or a local data store coupled to the local server). Again, such local storage can advantageously promote secure storage of information associated with inmate communications initiated at a given incarceration facility within the same incarceration facility in that communications were initiated. This can avoid costs, difficulties, and/or security vulnerability associated with storing communications non-locally (e.g., storing in a third party maintained cloud-based network).

A display engine (not shown) can be configured to cause a display of the information associated with the recorded communication, for example, displaying information associated with the recorded communication including the unique address associated with the inmate device. In various examples, the display engine can cause the display, via a GUI, such as those described herein. For example the display engine can cause such a display via a GUI of a monitoring device.

The display engine can provide a status (e.g., a current status) of an inmate device. A status can include an "active" status corresponding to an inmate device having an outstanding communication request and/or an established communication at a given time or an "inactive" status corresponding to an inmate device that does not have an outstanding communication request and/or does not have an established communication at a given time, among other statuses. A current status refers to a comparatively most recent status (e.g., most recent information) associated with an inmate device. The current status can be stored in an intermediate server, an application server, and/or a data store. In some examples, storing the current status can include replacing the previous status (e.g., a status immediately prior to the current status) with the current status. In some examples, the current status can be stored along with a plurality of other statuses, for instance, in chronological order based on a time of associated with each of the respective statuses.

In some examples, a display engine can provide a notification, such as a notification that a status of an inmate device has changed. For instance, an inmate device which was inactive (not involved in an inmate communication) can be changed to active (e.g., changed to active while conducting a communication). A notification can include email and/or displaying an indication via a GUI such as those described herein.

A GUI can, for example, electronically represent an indication of an active and/or inactive inmate device (e.g., a name, type of communication if active, location, etc.). That is, in some examples, an indicator can be displayed by a UI of a monitoring device. For example, the indicator can be a numeric indicator, a textual indicator, a pop-up window, and/or a particular color (e.g., display of the color green to indicate a particular inmate device has an "active" status), among other possible types of indicators. Conversely, a red color can be displayed to indicate a particular inmate has an "in active" status. Such displays can facilitate interactions between a user and a computer (e.g., allows a user to interact with a computer using images and/or text). Further, such a display, can lead to a monitoring and/or recording of a communication utilizing the active status inmate device, among other possible actions.

Display engine can display a prompt via an inmate device to an inmate. Such a prompt can enable receiving a selection of information displayed in the prompt, as described herein. In some examples, a prompt can include a display of an audio communication type without display of a video communication type, for instance, when a balance with an account associated with the customer is insufficient to satisfy a cost associated with the video communication.

Figure 4:
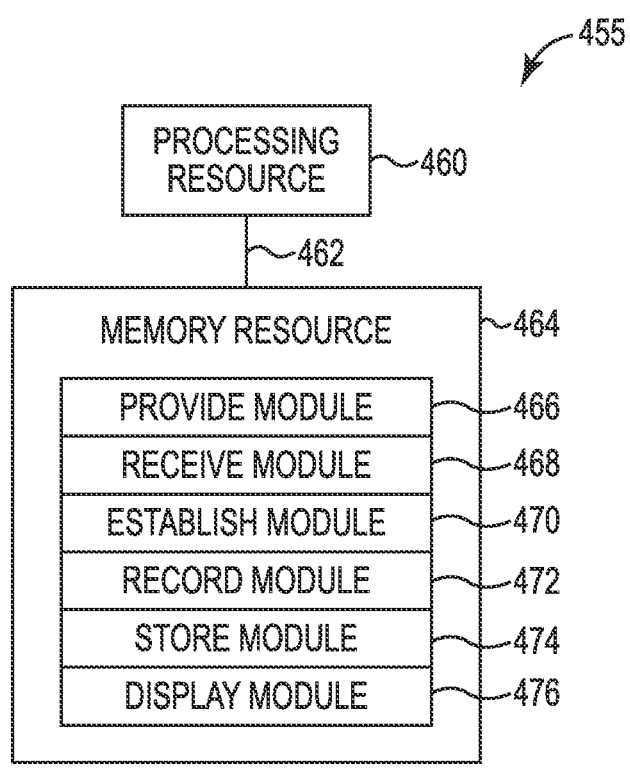
FIG. 4 illustrates a diagram of an example of a computing device for inmate communications according to the present disclosure.

FIG. 4 illustrates a diagram of an example of a computing device for inmate communications according to the present disclosure. The computing device 455 can utilize software, hardware, firmware, and/or logic to perform a number of functions described herein.

For example, the computing device 455 can be a combination of hardware and instructions to promote inmate communications. The hardware, for example can include a processing resource 460 and/or a memory resource 464 (e.g., computer-readable medium (CRM), data store, etc.). A processing resource 460, as used herein, can include a number of processors capable of executing instructions stored by a memory resource 464. Processing resource 460 can be integrated in a single device or distributed across multiple devices. The instructions (e.g., computer-readable instructions (CRI)) can include instructions stored on the memory resource 464 and executable by the processing resource 460 to implement a desired function (e.g., establish a communication between the inmate device and the registered device, etc.).

The memory resource 464 can be in communication with a processing resource 460. A memory resource 464, as used herein, can include a number of memory components capable of storing instructions that can be executed by processing resource 460. Such memory resource 464 can be a non-transitory CRM. Memory resource 464 can be integrated in a single device or distributed across multiple devices. Further, memory resource 464 can be fully or partially integrated in the same device as processing resource 460 or it can be separate but accessible to that device and processing resource 460. Thus, it is noted that the computing device 455 can be implemented on an inmate device and/or a collection of inmate devices, on a registered device and/or a collection of registered device, and/or on a combination of the inmate devices and the registered devices.

The memory resource 464 can be in communication with the processing resource 460 via a communication link (e.g., path) 462. The communication link 462 can be local or remote to a computing device associated with the processing resource 460. Examples of a local communication link 462 can include an electronic bus internal to a computing device where the memory resource 464 is one of volatile, non-volatile, fixed, and/or removable storage medium in communication with the processing resource 460 via the electronic bus.

The memory resource 464 can include a number of modules such as provide module 466, a receive module 468, an establish module 470, a record module 472, a store module 474, and a display module 476, etc. The number of modules 466, 468, 470, 472, 474, 476 can include CRI that when executed by the processing resource 460 can perform a number of functions. The number of modules 466, 468, 470, 472, 474, 476 can be sub-modules of other modules. For example, the provide module 466 and the establish module 470 can be sub-modules and/or contained within the same computing device. In another example, the number of modules 466, 468, 470, 472, 474, 476 can comprise individual modules at separate and distinct locations (e.g., CRM, etc.).

Each of the number of modules 466, 468, 470, 472, 474, 476 can include instructions that when executed by the processing resource 460 can function as a corresponding engine, including those as described herein. For example, the establish module 470 can include instructions that when executed by the processing resource 460 can function as the establish engine 344, for instance, to establish a communication between the inmate device and the registered device.

Similarly, the provide module 466 can include instructions that when executed by the processing resource 460 can function as a corresponding provide engine (not shown) to provide a communication request including identifying information to a local server, for example, where the identifying information includes a unique address of an inmate device.

The receive module 468 can include instructions that when executed by the processing resource 460 can function as a corresponding receive engine (not shown) to receive, from the local server, an authorization to permit a communication between the inmate device and a registered device associated with a registered telephone number.

The establish module 470 can again include instructions that when executed by the processing resource 460 can function as the establish engine 344 to establish the communication between the inmate device and the registered device, as described herein. The record module 472 can include instructions that when executed by the processing resource 460 can function as a record engine (not shown) to record a communication such as those described herein.

The store module 474 can include instructions that when executed by the processing resource 460 can function as a store engine (not shown) to store the recorded communication and/or information associated with the communication, for instance, in a local server, as described herein. The display module 476 can include instructions that when executed by the processing resource 460 can function as a display engine (not shown) to cause a display of the information associated with the recorded communication including the unique address associated with the inmate device In some examples, displaying can include causing a simultaneous display of a plurality of electronic representations, such as those associated with a plurality of communications. A simultaneous display refers to displaying a plurality of communications, a plurality of statuses (e.g., current statuses) of a plurality of inmate devices and/or information associated with the plurality of communications, etc., at the same time via an individual device (e.g., a single GUI of the individual device), among other information.

For example, a simultaneous display of information associated with a plurality of communications can include a communication of the plurality of communications being from a first location associated with an inmate device, another communication of the plurality of communications being from another location associated with another inmate device, and/or the first location and the another location can be separate and distinct. In this manner, a plurality of communications and/or information associated with a plurality of communications (e.g., from a plurality of incarceration facilities) can be displayed simultaneously to promote inmate communications including recording/monitoring thereof. In some examples, a respective status of each of a plurality of inmate devices can be displayed (e.g., simultaneous) via a graphical user interface of an electronic device such as those described herein.

Causing can include executing instructions stored in memory to directly cause a device (e.g., an inmate device and/or a monitoring device, etc.) to display, for example, electronic representations, indicative of respective statuses associated with each of the plurality of inmate devices and/or to communicate data with an expectation that it be processed by another device to cause the computing device to display the electronic representations, among other information.

Figure 5:
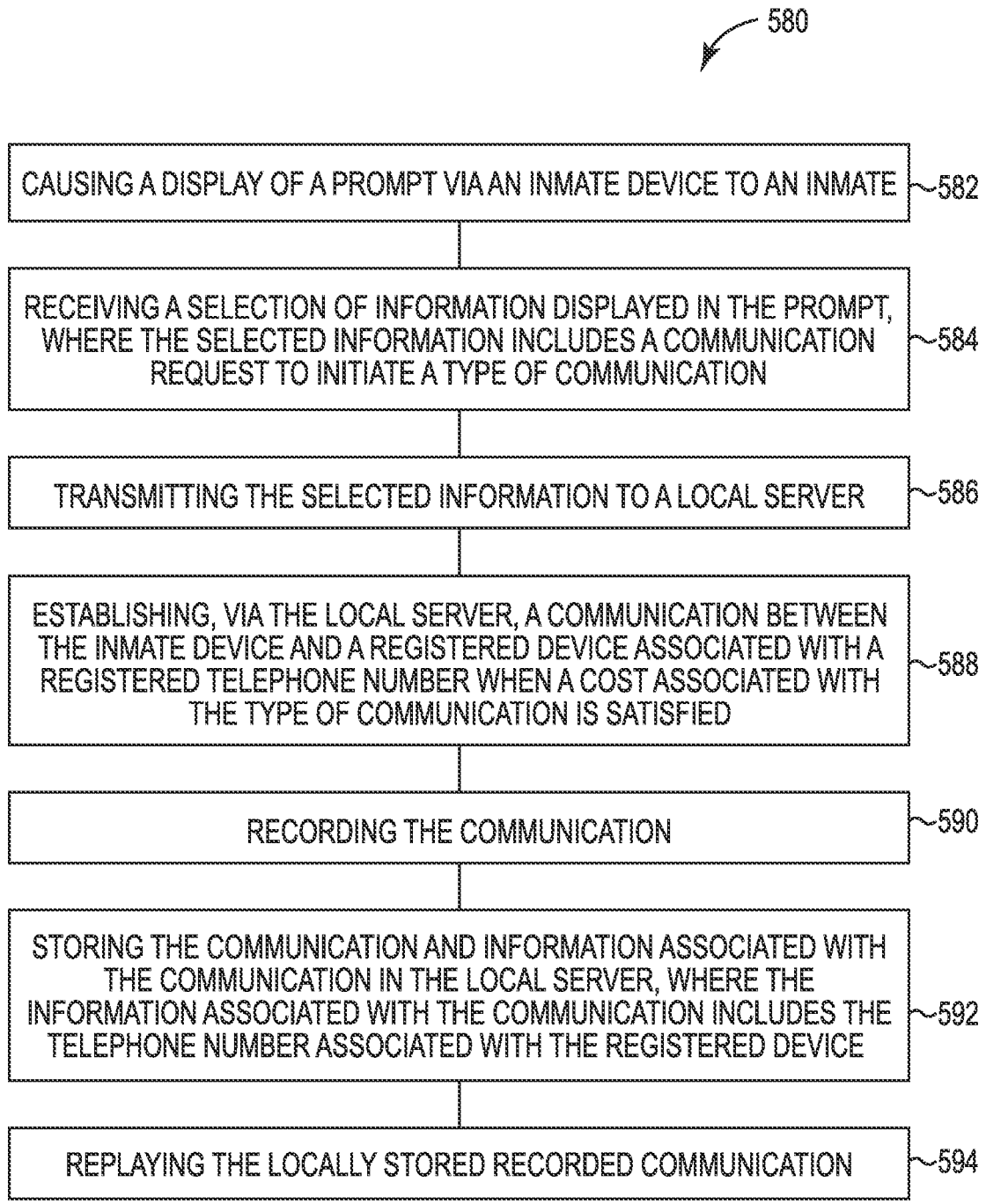
FIG. 5 illustrates a flow diagram of an example of a method for inmate communications according to the present disclosure.

FIG. 5 illustrates a flow diagram of an example of a method for inmate communications according to the present disclosure. In some embodiments, the method 480 can be performed utilizing a system (e.g., system 114 as referenced in FIG. 1) and/or a computing device (e.g., computing device 455 as referenced in FIG. 4), among other components. Similarly, blocks 582, 584, 586, 588, 590, 592, 594 can include executing instructions, for example, as described with regard to the engines herein, stored in memory to perform the examples of the method described therein.

The method 580 can include causing a display of a prompt via an inmate device, as shown at 582. For example, a prompt can be displayed via a GUI, as described herein, of an inmate device. The prompt can include various information and/or corresponding graphical representation(s) (e.g., similar to the graphical representations described with respect to FIG. 2) displayed via a GUI including graphical representation corresponding to particular type(s) of communication(s), billing types/information, registered devices and/or contacts associated with registered devices (e.g., an graphical representation corresponding to a customer, information services, support staff, etc.), and/or numeric graphical representation (e.g., icons) corresponding to a telephone number (e.g., of registered contacts) and/or a key pad for dialing telephone numbers, among other information and/or graphical representations.

As shown at 584, the method 580 can include receiving a selection of information displayed in a prompt, such as a prompt described at 582. For instance, selected information can include a communication request to initiate a particular type of communication (e.g., an audio communication and/or a video communication) and/or a request for satisfaction (e.g., payment) of a cost associated with the type of communication, among other information.

The method 580 can include transmitting the selected information to a local server, as shown at 586. Transmission can occur via a link, such as those described herein, for instance transmitting selected information from an inmate device, via a link, to the local server, among other suitable ways to transmit information to the local server.

As shown at 588, the method 580 can include establishing, via the local server, a communication between the inmate device and a registered device associated with a registered telephone number, for instance, when a cost associated with the type of communication is satisfied. For example, a balance associated with a customer can satisfy a cost associated with a type of communication when an amount of the balance (e.g., $10.00) is at least equal to a cost associated with a type of communication (e.g., $5.00 cost associated with a video communication).

In some examples, a cost of the communication can be zero. For example, an on-site communication such as those utilizing only an audio type of communication and/or certain remote communications including remote communications to select telephone numbers designated as having no cost associated therewith (e.g., a communication to a telephone number registered to attorney, a probation officer, etc.). An entity other than an incarceration facility can select which, if any, telephone numbers are registered has having a cost associated with a communication that is zero. When the cost of the communication is zero, the cost of the communication can be understood to be satisfied. The associated cost of the communication can be based on a type of communication itself (e.g., audio and/or video communication), duration of the communication, a method of payment (e.g., payment out of a balance of a registered account or collect payment), a relative distance of the communication (e.g., on-site, local, and/or long-distance).

The method 580, as shown at 590, can include recording the communication, such as the communication described at 588. Recording is done locally at an incarceration facility. Recording can be performed by the local servers themselves (e.g., routing the communication through a local server that can mirror or otherwise record a copy of the communication) and/or by other local components, local to the incarceration facility, that can provide a recording of a communication to a local server and/or local data store. A recording can include a time, a date, an inmate, a customer, a telephone number associated with the customer, an incarceration facility name and/or location, an inmate PIN number, a network address, a point of origination within an incarceration facility (e.g., laundry room phone), an audio and/or video recording of the communication, a duration (e.g., a total time) of the communication, a billing account associated with the communication, a total cost of the communication, among other information associated with the communication.

As shown at 592, the method 580 can include storing the communication and/or information associated with the communication in the local server. That is, each incarceration facility can include a number of local servers including a capability to store communications thereon. For instance, stored information associated with such as communication can include a telephone number associated with the registered device, among other information.

The method 580 can include replaying the locally stored recorded communication, for instance, the locally stored communication described at 592. In some examples, a locally stored recorded communication (e.g., stored in a local data store) can be replayed upon receipt of an input. Such an input can be received via a GUI of a monitoring device, as described herein. In some examples, replaying the video communication can include displaying information associated with the communication simultaneously, for instance, simultaneously with a recording of a communication via a graphical user interface (GUI). The information associated with the communication can include a stored photograph (e.g., previously stored in advance of establishing the communication) of the inmate (e.g., a mug shot) among other information. Display of information associated with the communication simultaneously can promote monitoring and/or analysis of a communication. For example, a stored photograph of an inmate can be compared to a live and/or recorded communication (e.g., a live or recorded imaged of an inmate participating in the communication). Such a comparison can ensure the intended inmate to participate in the communication (e.g., an inmate associated with an inmate device) is in fact the inmate participant in the communication, among other advantages.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource. The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 308 in FIG. 3.

In the detailed description of the present disclosure, reference is made to the accompanying drawings that form a part hereof, and in which is shown by way of illustration how examples of the present disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to a number of such elements and/or features. In addition, "for example" and similar phrasing is intended to mean, "by way of example and not by way of limitation".

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A system for inmate communications, comprising:
   an inmate device including a graphical user interface (GUI) that initiates a communication request; and
   a local server coupled to the inmate device, wherein the local server, responsive to the communication request, establishes a communication between the inmate device and a registered device associated with a registered telephone number using a verified communication capability of the registered device, and wherein the local server stores a recording of the communication and information associated with the communication in a local data store.

2. The system of claim 1, including a monitoring device having a GUI that displays the information associated with the communication, wherein the displayed information includes a unique address of the inmate device that is associated with a recording of the communication.

3. The system of claim 1, wherein system includes a central server, located at a location that is separate and distinct from the inmate device, which maintains billing information related to the communication.

4. The system of claim 1, wherein the inmate device initiates a communication request to utilize the verified capability of the registered device, and wherein verification of the verified communication capability of the registered device is performed by an entity other than an incarceration facility.

5. The system of claim 1, wherein the inmate device comprises an electronic tablet device.

6. The system of claim 1, wherein the local server establishes an audio communication between the inmate device and the registered device in response to a video communication being unavailable.

7. The system of claim 1, wherein the communication is an audio communication established by the local server via a public switched telephone network.

8. A non-transitory computer-readable medium storing instructions executable by a processing resource to:
provide a communication request including identifying information to a local server, wherein the identifying information includes a unique address of an inmate device and information identifying a registered device;
receive, from the local server, an authorization to permit a communication between the inmate device and the registered device associated with a registered telephone number;
establish the communication between the inmate device and the registered device using a verified communication capability of the registered device;
record the communication;
store the recorded communication and information associated with the communication in the local server; and
cause a display of the information associated with the recorded communication including the unique address associated with the inmate device.

9. The medium of claim 8, wherein the instructions to display include instructions to simultaneously display information associated with a plurality of communications including display of the information associated with the recorded communication.

10. The medium of claim 9, wherein a communication of the plurality of communications is from a first location associated with the inmate device, wherein another communication of the plurality of communications is from another location associated with another inmate device, and wherein the first location and the another location are separate and distinct.

11. The medium of claim 8, wherein the instructions include instructions to replay the recorded communication upon receipt of an input.

12. A method for inmate communications, comprising:
verifying a communication capability of a registered device;
causing a display of a prompt via an inmate device to an inmate;
receiving a selection of information displayed in the prompt, wherein the selected information includes a communication request to initiate a type of communication using the verified communication capability;
transmitting the selected information to a local server;
establishing, via the local server, a communication between the inmate device and the registered device associated with a registered telephone number, using the verified communication capability, when a cost associated with the type of communication is satisfied;
recording the communication;
storing the recorded communication and information associated with the communication in the local server; and
replaying the locally stored recorded communication.

13. The method of claim 12, wherein the communication type is a video communication, and wherein a video communication capability of the registered device is verified prior to establishing a video communication between the inmate device and the registered device using a verified video communication capability.

14. The method of claim 13, wherein the method includes replaying the video communication and displaying the information associated with the communication simultaneously via a graphical user interface (GUI), and wherein the information associated with the communication includes a stored photograph of the inmate.

15. The method of claim 12, wherein transmitting includes transmitting, via the local server, the selected information to a central server, and wherein the method includes providing a balance of an account from the central server to the local server to determine whether the cost associated with the type of communication is satisfied based on the balance.

16. The method of claim 12, wherein storing the communication includes storing the entire communication only in a local server.

17. The method of claim 12, wherein establishing a communication includes establishing a video communication when a balance of a registered account satisfies a cost associated with the video communication.

18. The method of claim 12, wherein the prompt includes display of an audio communication type without display of a video communication type when a balance with a registered account associated with a customer is insufficient to satisfy a video communication type.

19. The method of claim 12, wherein the inmate device is included in a plurality of inmate devices, wherein the method includes displaying a respective status of each of the plurality of inmate devices via a graphical user interface (GUI).

20. The method of claim 12, wherein causing the display includes causing a display of the verified communication capability of the registered device.

* * * * *